United States Patent [19]
Mitsutake et al.

[11] Patent Number: 5,333,021
[45] Date of Patent: Jul. 26, 1994

[54] PROJECTOR PROVIDED WITH A PLURALITY OF IMAGE GENERATORS

[75] Inventors: Hideaki Mitsutake, Tokyo; Hidetoshi Suzuki, Atsugi; Katsumi Kurematsu, Kawasaki; Kazuo Yoshinaga, Machida; Nobuo Minoura, Yokohama, all of Japan

[73] Assignee: Canon Kabushiki Kaisha, Tokyo, Japan

[21] Appl. No.: 811,020

[22] Filed: Dec. 20, 1991

[30] Foreign Application Priority Data

Dec. 27, 1990 [JP] Japan .................. 2-415302

[51] Int. Cl.$^5$ ............................. G03B 21/00
[52] U.S. Cl. ........................ 353/122; 353/30; 359/36
[58] Field of Search .............. 353/31, 30, 33, 34, 353/37, 122, 82; 359/67, 69, 62, 95, 36

[56] References Cited

U.S. PATENT DOCUMENTS

| | | | |
|---|---|---|---|
| 3,843,231 | 10/1974 | Borel et al. | 359/95 |
| 4,729,640 | 3/1988 | Sakata . | |
| 4,772,102 | 9/1988 | Fergason et al. | 359/67 |
| 4,822,146 | 4/1989 | Yamanobe et al. . | |
| 4,850,681 | 7/1989 | Yamanobe et al. . | |
| 4,981,352 | 1/1991 | Tejima et al. | 353/31 |
| 4,989,076 | 1/1991 | Owada et al. | 358/61 |
| 5,013,141 | 5/1991 | Sakata . | |
| 5,097,323 | 3/1992 | Sato et al. | 353/31 |
| 5,108,172 | 4/1992 | Flasck | 353/98 |

FOREIGN PATENT DOCUMENTS

| | | |
|---|---|---|
| 62-180343 | 8/1987 | Japan . |
| 63-216025 | 9/1988 | Japan . |
| 63-292892 | 11/1988 | Japan . |
| 2053030 | 2/1990 | Japan . |
| 1150117 | 6/1992 | Japan . |
| 2226174A | 6/1990 | United Kingdom . |

Primary Examiner—William A. Cuchlinski, Jr.
Assistant Examiner—William C. Dowling
Attorney, Agent, or Firm—Morgan & Finnegan

[57] ABSTRACT

A projector has means for supplying first and second radiation beams, first image generating means for modulating a plurality of portions of the first radiation beam individually and forming a deflected beam and a non-deflected beam to generate a first image, second image generating means for modulating a plurality of portions of the second radiation beam individually and forming a deflected beam and a non-deflected beam to generate a second image, and means for projecting the first and second images onto a predetermined plane by the use of one of the deflected beams and the non-deflected beams from the first and second image generating means, the first and second image generating means emitting the deflected beams so that most of the deflected beam from one of the generating means may substantially not enter the other generating means.

13 Claims, 7 Drawing Sheets

FIG. 1

(PRIOR ART)

PROJECTOR PROVIDED WITH A PLURALITY OF IMAGE GENERATORS

BACKGROUND OF THE INVENTION

1. Field of the Invention

This invention relates to a projector provided with a plurality of image generators, and particularly to a projector provided with a plurality of image generating liquid crystal light bulbs and projecting images of different colors formed by the liquid crystal light bulbs onto a screen to thereby display a color image on the screen.

2. Related Background Art

Figure 1:
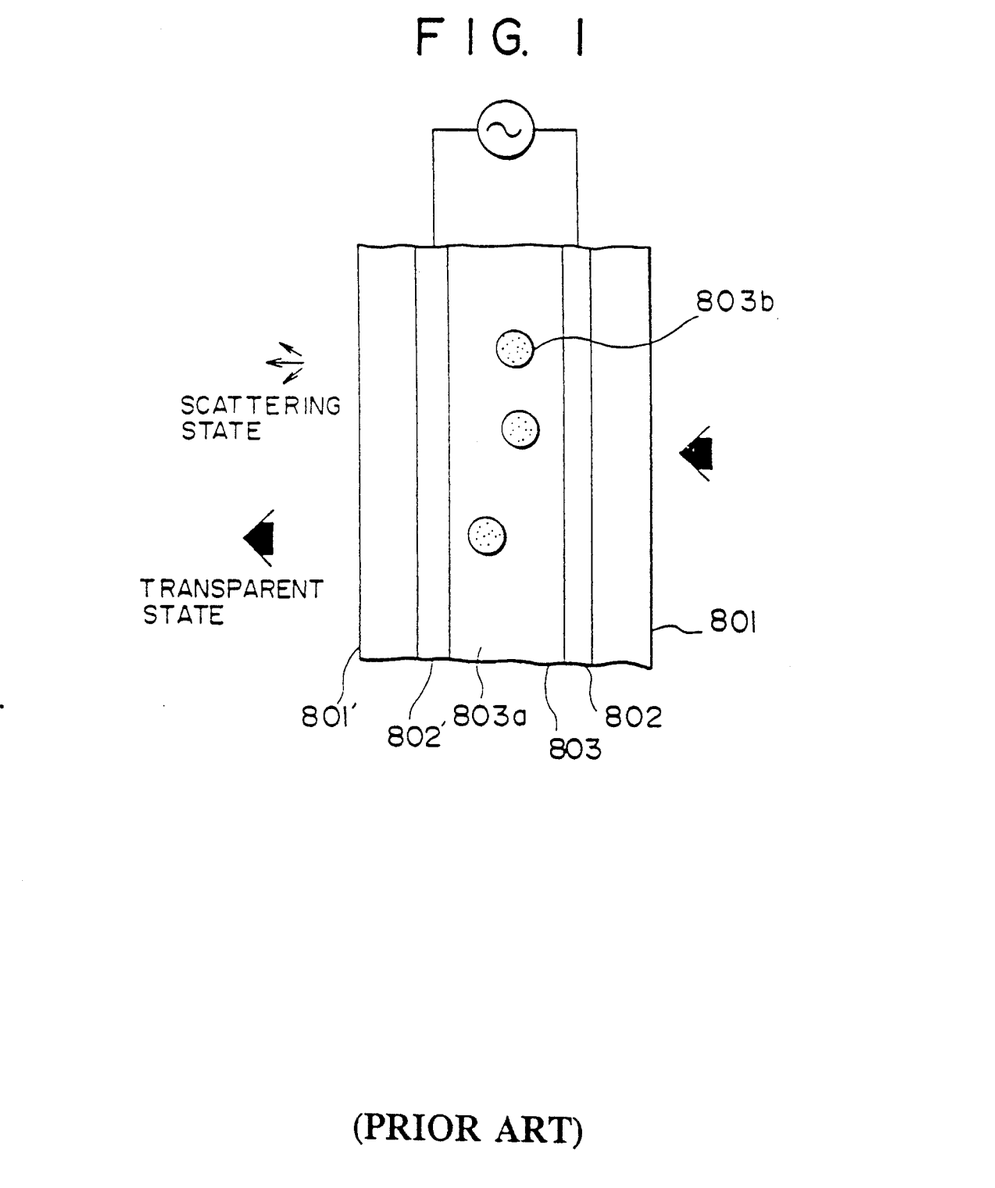
FIG. 1 is a cross-sectional view showing an example of a liquid crystal device of the scattering type.

FIG. 1 of the accompanying drawings is a cross-sectional view showing an example of a liquid crystal device according to the prior art having a scattering mode for scattering incident light. The layer 803 between a pair of transparent glass substrates 801 and 801' kept at a predetermined interval is impregnated with a high molecular medium 803a and droplets 803b comprising liquid crystal molecules having positive dielectric anisotropy dispersed in said high molecular medium 803a. Transparent electrodes 802 and 802' are disposed on the inner surfaces of the glass substrates 801 and 801'. The materials of the high molecular medium 803a and the liquid crystal molecules are chosen so that the refractive index of the former and the ordinary refractive index of the latter may be equal to each other.

When no voltage is applied between the transparent electrodes 802 and 802', the liquid crystal molecules in the droplets 803b are oriented at random and therefore, the incident light onto the liquid crystal device are scattered in the droplets 803b. On the other hand, when a voltage is applied between the transparent electrodes, the major axes of the liquid crystal molecules become uniform in a direction perpendicular to the surfaces of the glass substrates 801 and 801' and therefore, the refractive indices of the liquid crystal molecules and the high molecular medium coincide with each other. Accordingly, the incident light onto the liquid crystal device travels straight without being scattered by the droplets 803b.

As a liquid crystal device of similar scattering type, there is one of the type in which low molecular liquid crystal is dispersed at random in a network comprising high molecular mediums overlapped with each other.

These liquid crystal devices of the scattering type, unlike TN liquid crystal devices, for example, do not require any polarizing plate, and this leads to the advantage that they have a high rate of light utilization and are easy to obtain a bright image when they are used as a display device.

Figure 2:
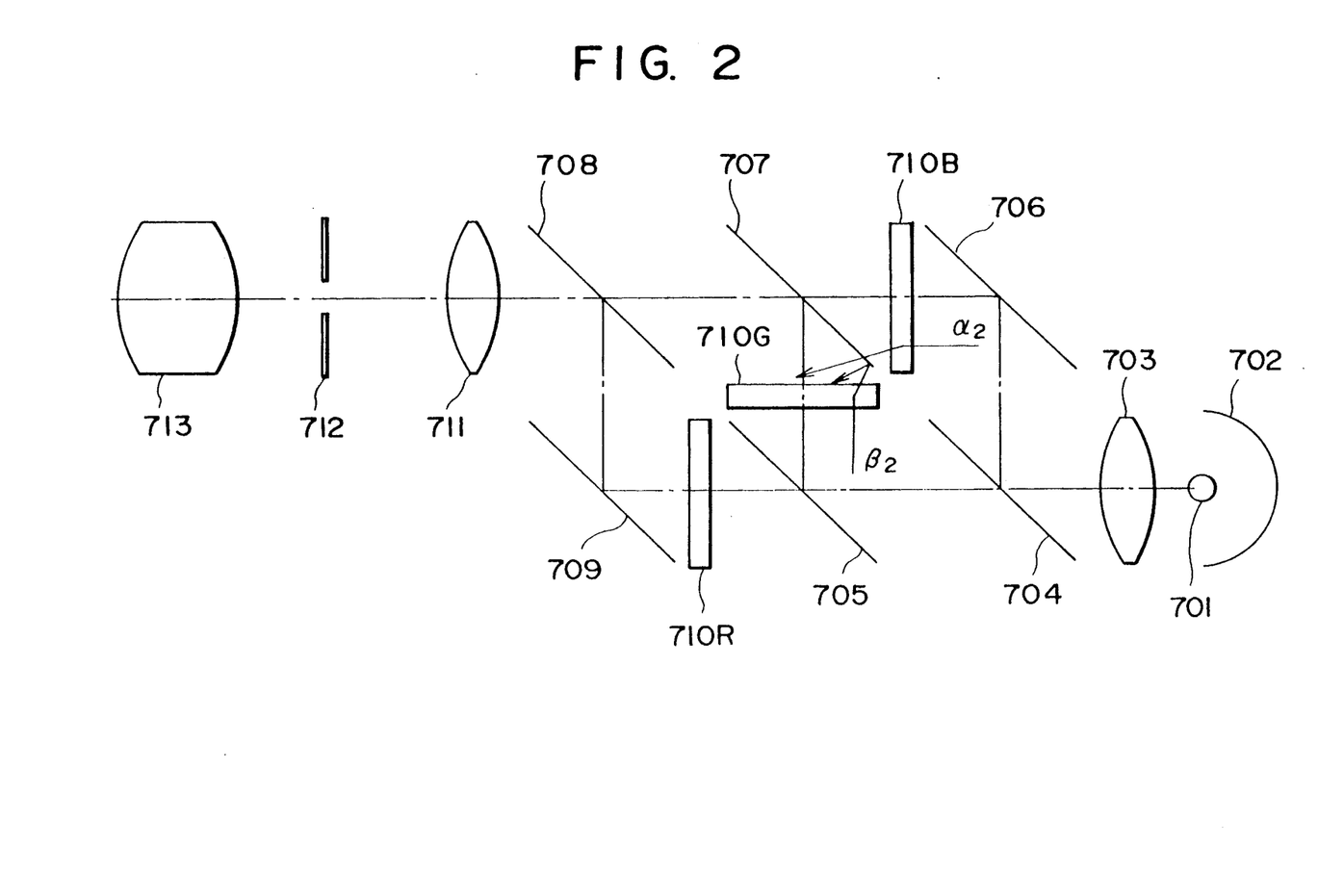
FIG. 2 is an illustration showing an example in which the liquid crystal device of FIG. 1 is applied to a color projection type display apparatus.

FIG. 2 of the accompanying drawings is an illustration showing one of constructions conceivable when the liquid crystal device of the above-described scattering type is applied to a color projection type display apparatus.

A white light beam emitted from a light source 701 comprising a halogen lamp, a xenon lamp or the like enters a condensor lens 703 directly or through a reflector 702 and is made into a parallel light beam by the condensor lens 703. The parallel light beam is resolved into light beams of three colors by a color resolving system comprising a dichroic mirror 704 for reflecting blue, a dichroic mirror 705 for reflecting green and a total reflection mirror 706, and the respective light beams enter liquid crystal devices 710R, 710G and 710B. Each of the liquid crystal devices 710R, 710G and 710B is divided into a plurality of matrix-like picture elements, each of which is independently driven by an electrical signal conforming to the substance of display and becomes scattered or transparent relative to the incident light beam. The light beams transmitted through the liquid crystal devices 710R, 710G and 710B are again made into a light beam having the information of color images by a color combining system comprising a dichroic mirror 707 for reflecting green, a dichroic mirror 708 for reflecting red and a total reflection mirror 709. Thereafter, the light beam passes through a condensing lens 711 to a light intercepting plate 712 having an aperture which defines an opening about the optical axis. With regard to the light which enters each picture element of the liquid crystal devices 710R, 710G and 710B, the light beam passing through the picture element which is in a transparent state passes through the aperture portion of the light intercepting plate 712 and is projected onto a screen, not shown, by a projection lens 713. On the other hand, the light beam passed through the picture element which is in a scattered state is intercepted by the light intercepting portion of the light intercepting plate 712 and does not arrive at the projection lens 713 and therefore, is not projected onto the screen, not shown. By the scattering-transmitting mode of each picture element of the liquid crystal devices 710R, 710G and 710B being thus changed over, image display can be accomplished.

However, of the light beam scattered by the picture element which is in a scattered state, rays of great scattering angle, like the rays $\alpha_2$ and $\beta_2$ of FIG. 2, re-enter other adjacent liquid crystal device 710G (the ray $\alpha_2$) and re-enter the same liquid crystal device 710G (the ray $\beta_2$) before they are processed by the light intercepting plate 712. Part of such rays is scattered by the liquid crystal device 710G which they have re-entered, and passes through the aperture portion of the light intercepting plate 712 and is displayed as ghost or flare on the screen, thereby deteriorating the quality of image on the screen.

A similar situation occurs not only in the liquid crystal device of the aforedescribed scattering type, but also in all of light bulbs using a mode in which light is diffracted or refracted and the direction of travel of this light is changed, such as those which use liquid crystal to form a diffraction grating.

SUMMARY OF THE INVENTION

The present invention has been made in view of the above-noted problems and an object thereof is to provide a projector capable of displaying images of good quality.

A first form of the present invention for achieving the above object is provided with means for supplying first and second radiation beams, first image generating means for modulating a plurality of portions of said first radiation beam individually and forming a deflected beam and a non-deflected beam to generate a first image, second image generating means for modulating a plurality of portions of said second radiation beam individually and forming a deflected beam and a non-deflected beam to generate a second image, and means for projecting said first and second images onto a predetermined plane by the use of one of said deflected beams and said non-deflected beams from said first and second image generating means, said first and second image generating means emitting said deflected beams so that most of said deflected beam from one of said generating means may substantially not enter the other generating means.

A second form of the present invention for achieving the above object is provided with means for supplying first and second radiation beams, first image generating means for modulating a plurality of portions of said first radiation beam individually and forming a diffused beam and a non-diffused beam to generate a first image, second image generating means provided next said first image generating means for modulating a plurality of portions of said second radiation beam individually and forming a diffused beam and a non-diffused beam to generate a second image, and means for projecting said first and second images onto a predetermined plane by the use of one of said diffused beams and said non-diffused beams from said first and second image generating means, said first and second image generating means being designed such that said diffused beams have a rotation-asymmetric orientation characteristic, to direct most of said diffused beam from one of said generating means in a direction different from the direction toward the other generating means. Said diffused beams can typically be made by causing at least one of diffraction and scattering to occur in said radiation beams.

DETAILED DESCRIPTION OF THE PREFERRED EMBODIMENTS

Figure 3:
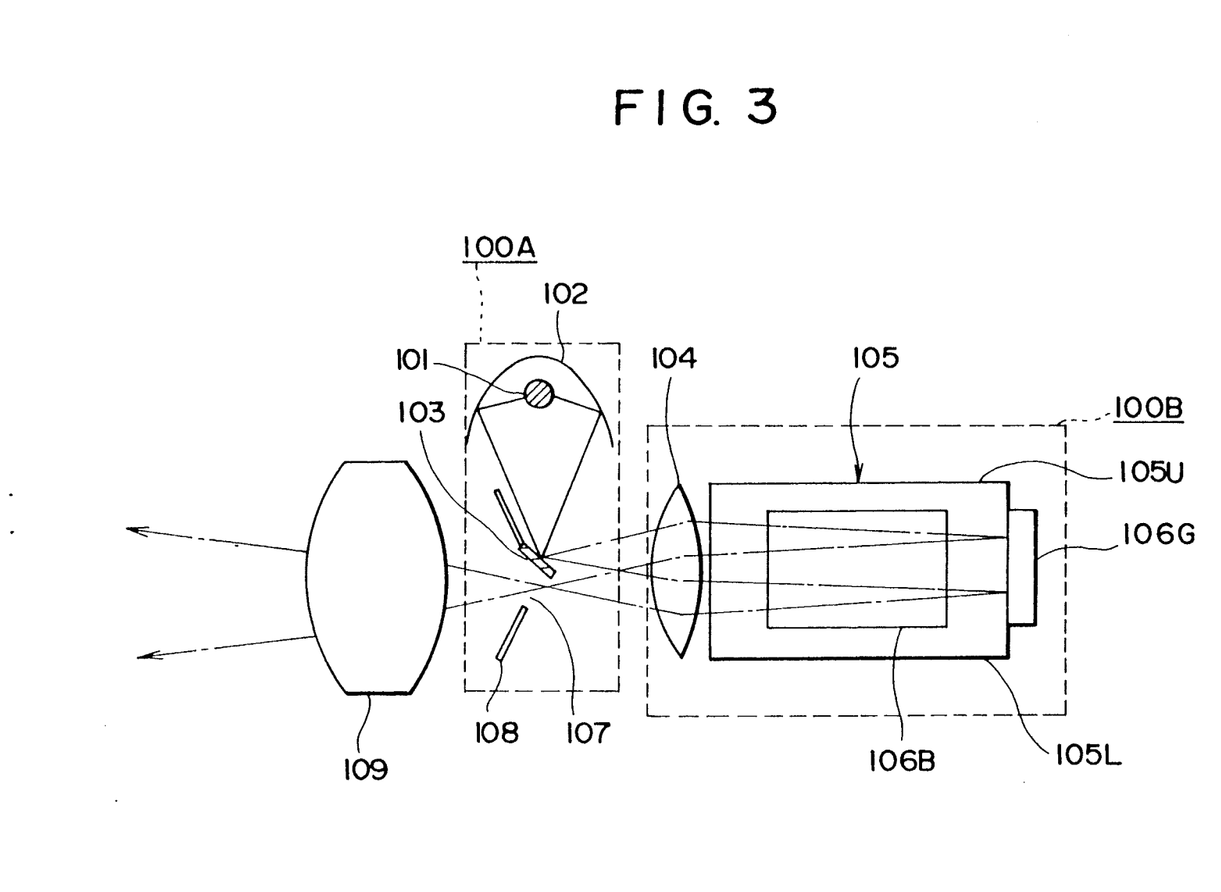
FIG. 3 shows the construction of a first embodiment of the present invention.

FIG. 3 shows the general construction of an embodiment of the projection type image display apparatus of the present invention.

A light beam emitted from a light source 101 is condensed on a reflecting mirror 103 by a rotatable elliptical mirror 102, and is directed toward a schilieren lens 104 by the reflecting mirror 103. This light beam is made into a parallel light beam by the lens 104, whereafter it is resolved into light beams of three colors, red, green and blue, by a cross dichroic mirror 105 having a pair of dichroic films crossing cruciformly, and these light beams are made to enter liquid crystal devices (106G, 106B, etc.) provided for the light beams of respective colors, and are modulated and reflected by the respective devices, and are again combined by the cross dichroic mirror 105. Like this, the cross dichroic mirror 105 serves as a light separating optical system and also as a light combining optical system. The color image lights combined by the cross dichroic mirror 105 are condensed on an opening portion 107 by the schilieren lens 104, are projected onto a screen, not shown, by a projection lens 109 and form a color image on the screen.

Figure 4A:
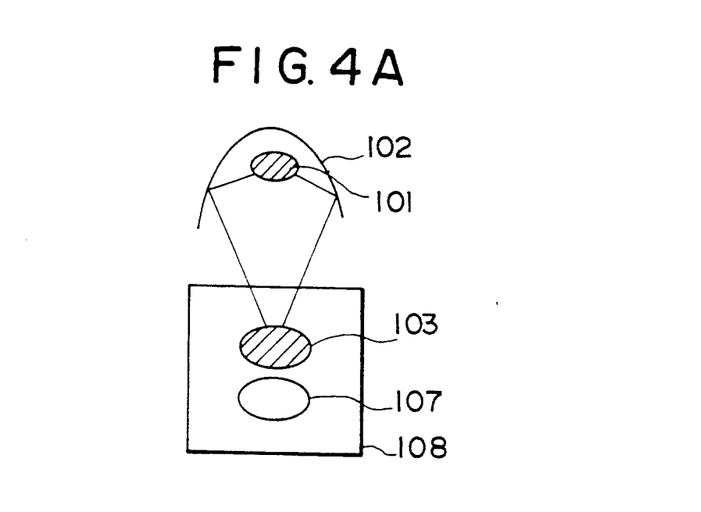
FIG. 4A shows the construction of a light source unit 100A in FIG. 3.

FIG. 4A shows a light source unit 100A encircled by a dotted line in FIG. 3 as it is seen from the schilieren lens 104 side. The light source unit 100A, as shown, has a laterally long light emitting portion, and the opening portion 107 in a light intercepting portion 108 through which image display light passes and the reflecting mirror 103 also have a laterally long shape. The reflecting mirror 103 is herein shown as laterally long, but this is not requisite condition. The lengthwise direction of the light source 101, the opening portion 107 and the reflecting mirror 103 in FIG. 4A corresponds to a direction perpendicular to the plane of the drawing sheet of FIG. 3, in the apparatus of FIG. 3.

Figure 4B:
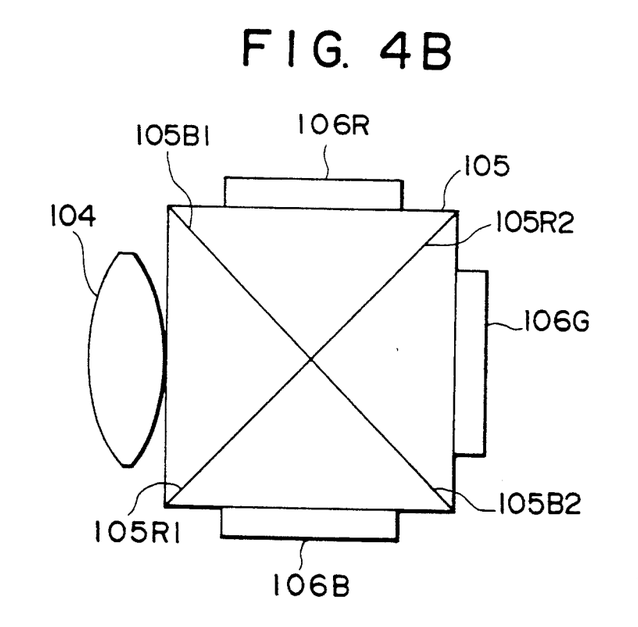
FIG. 4B shows the construction of an image forming unit 100B in FIG. 3.

FIG. 4B shows an image forming unit 100B encircled by a dotted line in FIG. 3 as it is seen from above the cross dichroic mirror 105.

A red light beam reflected by dichroic mirrors 105R1 and 105R2 which reflect only the red in the cross dichroic mirror 105 of the light passed through the schilieren lens 104 enters a liquid crystal device 106R for red, and likewise a blue light beam reflected by dichroic mirrors 105B1 and 105B2 for blue enters a liquid crystal device 106B for blue. The remaining green light beam is transmitted through each dichroic mirror and enters a liquid crystal device 106G for green.

Figure 5A:
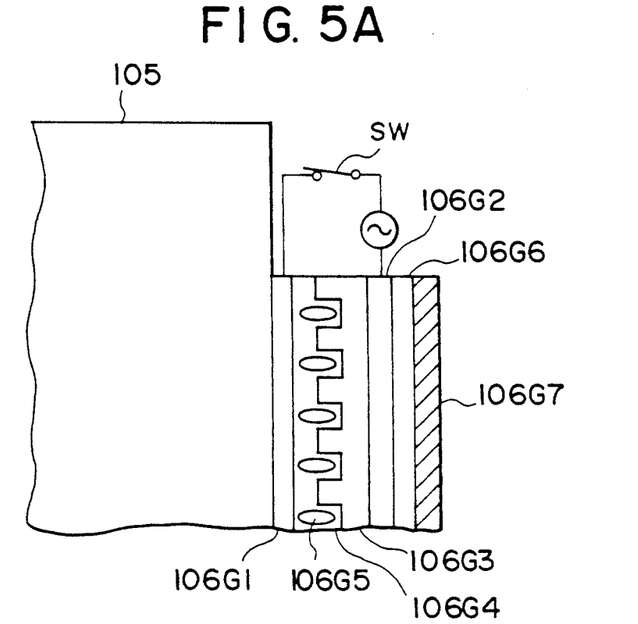
FIG. 5A shows the construction of a liquid crystal device 106 when in a transmitting state.
Figure 5B:
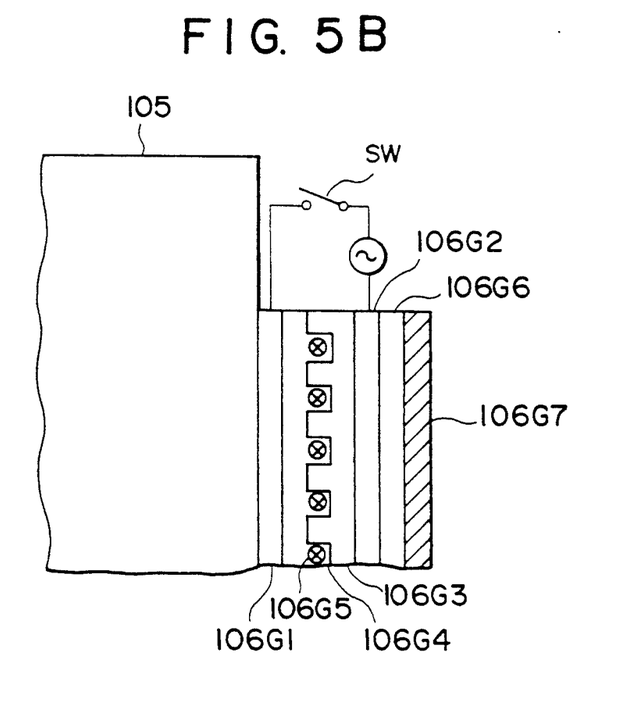
FIG. 5B shows the construction of the liquid crystal device 106 when in a diffused state.

FIG. 5 shows the construction of the liquid crystal device 106G for green of the three liquid crystal devices for three colors of FIG. 4B as a representative one, and the constructions of the liquid crystal devices 106B and 106R for blue and red are the same as the construction of the liquid crystal device 106G for green.

Each liquid crystal device actually assumes two-dimensional matrix structure vertically and horizontally divided into a predetermined number of picture elements, but here, a certain picture element of the liquid crystal device 106G is shown and the operation principle thereof will be described below.

Between a pair of glass substrates 106G1 and 106G2 inside which there are formed transparent electrodes, a diffraction grating 106G3 comprising periodic relief structure having a pitch of the order of micron is formed so that the grooves (recesses) thereof may extend in a horizontal direction (a direction perpendicular to the plane of the drawing sheet) which is the direction in which the devices 106B and 106R are adjacent to the device 106G, and the intermediate layer 106G4 between the glass substrate 106G1 and the diffraction grating 106G3 is impregnated with nematic liquid crystal molecules 106G5 having positive dielectric anisotropy. The interface of the glass substrate 106G1 or the diffraction grating 106G3 is subjected to orientation treatment so that when as shown in FIG. 5A, a switch SW is set to its ON position and there is brought about a transmission mode in which a voltage is applied, the major axes of the liquid crystal molecules 106G5 may become uniform in the direction of electric field perpendicular to the surfaces of the glass substrates 106G1 and 106G2 and that when the switch SW is set to its OFF position and there is brought about a scattering mode in which no voltage is applied, the direction of the groove in the diffraction grating 106G3 and the major axes of the liquid crystal molecules 106G5 may become parallel to each other as shown in FIG. 5B. The reference character 106G6 designates a quarter wavelength plate having its main axis in a direction forming an angle of 45° with respect to the direction of the groove in the diffraction grating 106G3, and the reference character 106G7 denotes a reflecting mirror formed of aluminum evaporated film or the like. The materials of the diffraction grating 106G3 and the liquid crystal molecules 106G5 are chosen so that the refractive index of the former and the ordinary refractive index $n_0$ of the latter may be equal to each other.

In the liquid crystal device of the above-described construction, in the state shown in FIG. 5A, the incident light is hardly diffracted because the refractive indices of the liquid crystal molecules 106G5 and the diffraction grating 106G3 for the incident light beam are equal to each other. Also, the diffraction of this incident light hardly takes place even after the incident light is reflected by the reflecting mirror 106G7 through the quarter wavelength plate 106G6, and the light recombined by the cross dichroic mirror 105 passes through the opening portion 107 and is projected onto the screen (see FIG. 3).

On the other hand, in the state shown in FIG. 5B, the polarized component in the vertical direction (the vertical direction in the plane of the drawing sheet) of the incident light is hardly diffracted at first, and the polarized component in the horizontal direction (the direction perpendicular to the plane of the drawing sheet) of the incident light is diffracted at first because the refractive indices of the liquid crystal molecules 106G5 and the diffraction grating 106G3 for this polarized light differ from each other. Further, as regards the incident light reflected by the reflecting mirror 106G7 through the quarter wavelength plate 106G6, the polarized component which has not been diffracted at first is now chiefly diffracted because the polarized components in the horizontal direction and the vertical direction change places with each other. Thus, both of the polarized components of the incident light which are orthogonal to each other are diffracted and therefore, the light beam diffracted and having changed its direction of travel does not pass through the opening portion, but is absorbed by the light intercepting portion 108 (see FIG. 3).

Figure 6:
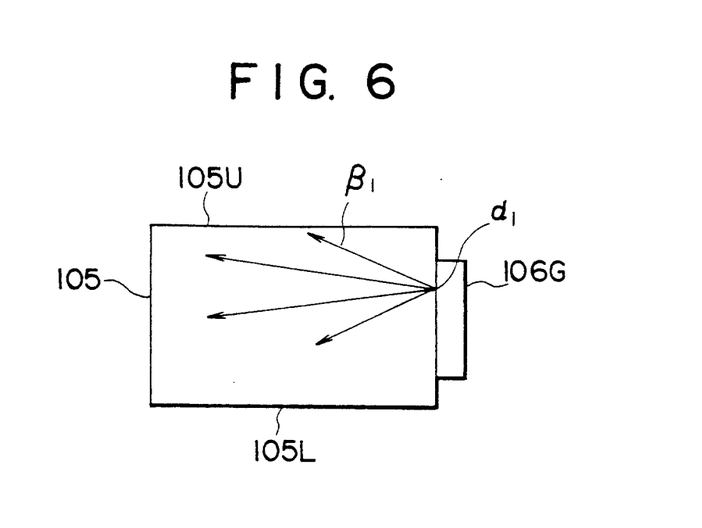
FIG. 6 shows the state of diffracted light when the liquid crystal device is in a diffused state.

FIG. 6 shows the chief direction of diffraction of the diffracted light from the liquid crystal device 106G described with reference to FIG. 5. Since the grooves in the diffraction grating of the device 106G are formed in the horizontal direction (the direction perpendicular to the plane of the drawing sheet) which is the direction in which the neighboring device lies, diffusing power has directionality in the vertical direction, and diffraction takes place chiefly in the vertical direction (in the plane of the drawing sheet) from a point $a_1$ on the liquid crystal device 106G. At this time, a light beam of a great angle of diffraction as indicated by $\beta_1$ enters the upper and surface 105U or the lower end surface 105L of the cross dichroic mirror 105, but the direct entrance of the light beam into the liquid crystal devices 106R and 106B for the other colors hardly takes place. Also, preferably, the upper and lower end surfaces of the cross dichroic mirror 105 may be subjected to light absorption treatment to thereby intercept the light. Also, where as shown, the cross dichroic mirror 105 is comprised of a prism, if the upper and lower end surfaces thereof are made into mirror surfaces and the angle of incidence of the reflected diffracted light when the diffracted light has been intactly totally reflected onto the schilieren lens 104 is set to a great angle, this reflected diffracted light will impinge on the light intercepting portion outside the opening portion 107 and therefore, no problem will arise (see FIG. 3). In any case, in the construction of the present embodiment, the direction of travel of the diffracted light is not toward the liquid crystal devices for the other colors and therefore, it never happens that unnecessary light is scattered by the liquid crystal devices for the other colors and deteriorates the quality of image on the screen.

In the present embodiment shown in FIG. 3, the shape of the light emitting portion of the light source 101 is made into a horizontally long shape as shown in FIG. 2, and in accordance therewith, the opening portion 107 onto which the horizontally long image of the light source 101 is projected through each liquid crystal device is also made into a horizontally long shape. On the other hand, the diffraction in each liquid crystal device takes place intensely in the vertical direction which is the direction of the mirror diameter of the opening portion and therefore, the angle of diffraction necessary for the display of image may be small. Conversely speaking, it becomes easy to carry out such a condition that the diffracted light does not enter the opening portion 107, and image display of higher contrast can be realized without the rate of utilization of the light beam from the light source being reduced.

As described above, in the present embodiment, each liquid crystal device is designed to diffract the incident light chiefly in the other direction than toward the liquid crystal devices for the other colors, whereby the occurrence of flare or ghost can be decreased or prevented. Also, the emergent light from each liquid crystal device is projected by a single projection lens, whereby a compact construction is provided. Also, by keeping the constant relation as described above, it becomes easy to obtain an image of high contrast.

While in the present embodiment, the light source used is of a shape in which the light emitting portion thereof is horizontally long, it is also possible to use a light source merely having a substantially spherical light emitting portion, or to combine such light source with an anamorphic optical system to thereby project a horizontally long light source image onto the reflecting mirror 103. In the present invention, the construction of the illuminating system is not restricted to that disclosed herein. With regard also to the construction of the liquid crystal devices, conditions such as the direction of orientation depending on the dielectric anisotropy, refractive index anisotropy and interface action of the liquid crystal molecules and the refractive index of the diffraction grating (the diffraction grating 106G3 in FIG. 5) are neither restricted to those of the embodiment disclosed herein.

In the above-described first embodiment, the orientation of the liquid crystal molecules 106G5 is substantially complete with respect to a predetermined direction in the liquid crystal layer and therefore, diffraction or scattering in that direction has hardly taken place. In the liquid crystal devices having liquid crystal dispersed in the high molecular medium of FIG. 1, the liquid crystal is optically considerably regularly distributed with respect to at least one direction in the liquid crystal layer, whereby the diffusion characteristic of the liquid crystal devices can be endowed with directionality, and the direction in which diffusing power is strong (the direction in which diffused light is chiefly directed) is made equal to a direction differing from the direction in which the liquid crystal devices for the other colors are adjacent to each other, preferably the vertical direction, whereby the incidence of ghost or flare light onto the screen can be mitigated.

As a method of constructing the liquid crystal device as described above, there are conceived the following three methods.

(1) A material (monomer) before the polymerization of high molecules (polymer) forming a network and low molecular liquid crystal are poured into between a pair of substrates facing each other with a liquid crystal layer therebetween, whereafter the step of shifting the two substrates from each other in one direction by a minute amount is carried out. Thereby, the monomer assumes an arranged state in which it is considerably uniform in that direction. Thereafter, a polymerizing action is caused by the application of ultraviolet ray or heating, whereby the network of the high molecules also comes to have directionality in the layer between the substrates, and the low molecular liquid crystal contained therein also becomes considerably uniform in one direction. At this time, the refractive index of the high molecules and the ordinary refractive index of the low molecular liquid crystal are combined together and the positive dielectric anisotropy of the low molecular liquid crystal is chosen, whereby the switching action that diffusion takes place when no voltage is applied to electrodes formed on the opposed surfaces of the pair of substrates, and transmission takes place when a voltage is applied to said electrodes can be accomplished.

(2) Use is made of such a material that a mixture of a monomer before the polymerization of high molecules and low molecular liquid crystal forms a liquid crystal layer, and a liquid crystal oriented layer is provided inside a pair of substrates facing each other with said liquid layer therebetween, whereby the liquid crystal molecules in the above-mentioned liquid crystal layer are made uniform in one direction. By causing a polymerization reaction in this state, the high molecule network and the arranged state of the low molecular liquid crystal can be endowed with directionality.

(3) In the liquid crystal device of FIG. 1 wherein low molecular liquid crystal is in the form of droplets, a material which weakens the action of making the area of high molecules and the area of low molecular liquid crystal easily separable is chosen and directionality is given by the method shown in item (1) above or the like, whereby there is obtained a desired effect.

A second embodiment of the present invention will now be described with reference to FIG. 7.

The first embodiment is one in which the present invention is applied to a projection type display apparatus provided with reflection type liquid crystal devices, but the present invention is also applicable to a projection type display apparatus provided with transmission type liquid crystal devices. An example of the liquid crystal device used in the construction as shown, for example, in FIG. 2 is shown in FIG. 7.

In the liquid crystal device of the present embodiment, an element having glass substrates 561, 562, a diffraction grating 563 and liquid crystal molecules 565 similar in construction to the glass substrates 106G1, 106G2, the diffraction grating 106G3 and the liquid crystal molecules 106G5 in FIG. 5 and an element having glass substrates 561', 562', a diffraction grating 563' similar in the direction of groove to the diffraction grating 563, and liquid crystal molecules 565' are arranged in tandem along the optical path, and by a half wavelength plate 566 provided between the two elements, the directions of polarization of the polarized components of the incident light which are orthogonal to each other are rotated by 90° in the course in which the incident light is made to enter from the first element into the second element. Thereby, as in the liquid crystal device of the first embodiment, both of the polarized components of the incident light which are orthogonal to each other are diffracted so that diffusion toward the other liquid crystal device may hardly take place.

A third embodiment of the present invention will now be described with reference to FIG. 8.

Figure 8:
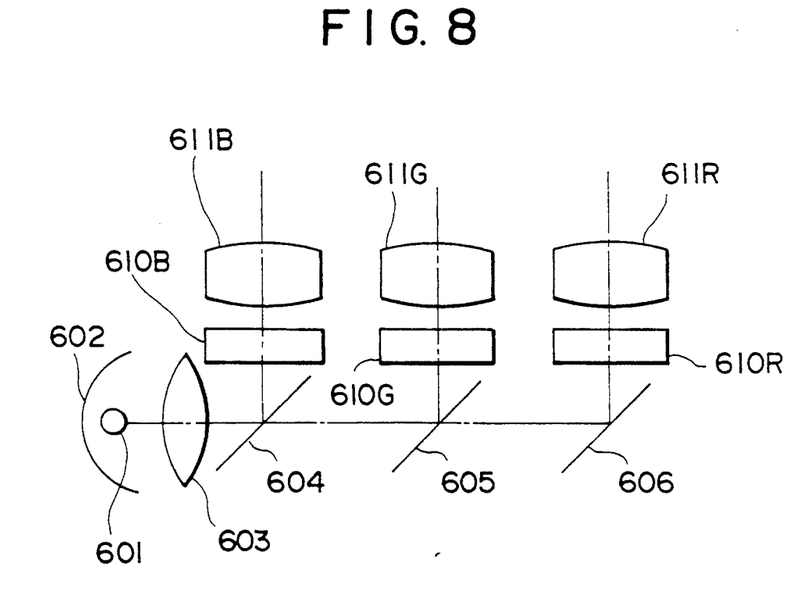
FIG. 8 shows the construction of an apparatus according to a third embodiment of the present invention.

FIG. 8 shows a so-called multiple-lens projection type display apparatus provided with a light source 601, a reflector 602, a condenser lens 603, dichroic mirrors 604, 605 and a reflecting mirror 606 which together constitute an illuminating system similar to the system comprising the members 701–706 of FIG. 2 and a color resolving system, and comprised of liquid crystal devices 610R, 610G and 610B for respective colors and projection lens systems 611R, 611G and 611B for respective colors. In the present embodiment, the liquid crystal devices 610R, 610G and 610B are comprised of those shown in the first or second embodiment. In the present embodiment, a light intercepting plate provided with a predetermined opening and for intercepting diffracted light is provided in each of the projection lens systems 611R, 611G and 611B.

In the present embodiment, the intervals between the liquid crystal devices 610R, 610G and 610B can be made small and therefore, the deviation of the optical axis inherent to the multiple-lens type which occurs among the projection lens systems 611R, 611G and 611B can be reduced. Accordingly, the shift of color caused by the difference between the angles of incidence of the imaging light beams of respective colors onto a screen, not shown, can be decreased.

Figure 7:
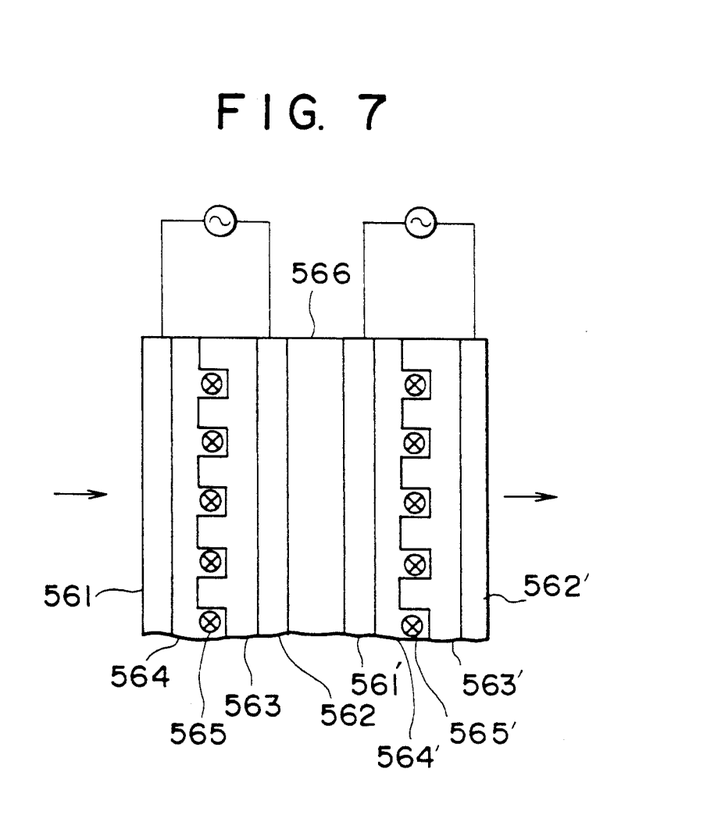
FIG. 7 shows the construction of the essential portions of a second embodiment of the present invention.

The above-described embodiments have been shown with respect onto to a construction for light which is not polarized, but of course, the present invention is also applicable to a construction which uses as a light source a laser emitting rectilinearly polarized light or in which a polarizing plate is provided on the incidence side of each liquid crystal device and the quarter wavelength plate 106G6 in FIG. 5 and the second element comprised of the members 561'–565' in FIG. 7 are omitted.

While the shape of the light source image on the opening portion has been mentioned only in the first embodiment, what has been mentioned there also holds true of the other embodiments.

Further, the idea of the present invention can be applied not only to the devices described above, but also to other light modulation devices of the diffusion type.

Furthermore, the idea of the present invention can also be applied to an apparatus in which light transmitted through the picture elements of a light modulation device is intercepted and light scattered or diffracted by the picture elements is projected onto a screen to thereby form an image.

The present invention has the effect that an image from which ghost or flare is mitigated or eliminated can be projected, because as described above, other devices are not disposed in the direction in which the diffusing power of a certain device is strong.

What is claimed is:

1. A projector having;

means for supplying first and second radiation beams;

first image generating means for modulating a plurality of portions of said first radiation beam individually and forming a diffused beam and a non-diffused beam to generate a first image;

second image generating means for modulating a plurality of portions of said second radiation beam individually and forming a diffused beam and a non-diffused beam to generate a second image, said second image generating means being provided next said first image generating means; and means for projecting said first and second images onto a predetermined plane by the use of one of said diffused beams and said non-diffused beams from said first and second image generating means, said first and second image generating means being designed such that said diffused beams have a rotation-asymmetric orientation characteristic, to direct most of said diffused beams from one of said generating means in a direction different from the direction toward the other generating means.

2. A projector according to claim 1, wherein said first and second image generating means each include a liquid crystal device provided with liquid crystal having a first mode for intactly passing an incident beam therethrough and a second mode for scattering said incident beam, and the liquid crystal device(s) of said first and second image generating means scatter said incident beam to thereby effect said diffusion.

3. A projector according to claim 2, wherein said liquid crystal device(s) reflect said portions of said first and second radiation beam, respectively.

4. A projector according to claim 2, wherein said liquid crystal device(s) transmit said portions of said first and second radiation beams, respectively therethrough.

5. A projector according to claim 1, wherein said first and second image generating means each include a liquid crystal device provided with liquid crystal having a first mode for intactly passing an incident beam therethrough and a second mode for diffracting said incident beam, and the liquid crystal device(s) of said first and second image generating means diffract said incident beam to thereby effect said diffusion.

6. A projector according to claim 5, wherein said liquid crystal device(s) reflect said portions of said first and second radiation beams, respectively.

7. A projector according to claim 6. wherein each of said liquid crystal device(s) has;

a pair of transparent substrates facing each other, the surfaces of said pair of transparent substrates which are adjacent to the other of said substrates having transparent electrodes formed thereon;

grating structure formed on said transparent electrode of one of said pair of transparent substrates, a plurality of grooves in said grating structure extending toward the liquid crystal device(s) adjacent image generating means;

a liquid crystal layer having a double refractive property and filling the space between the transparent electrode of the other of said pair of transparent substrate and said grating structure;

drive means using said transparent electrodes to control the direction of orientation of a plurality of liquid crystal molecules in said liquid layer to thereby direct said plurality of liquid crystal molecules in a direction substantially perpendicular to said surfaces and generate said first mode, and direct said plurality of liquid crystal molecules in a direction substantially parallel to said surfaces and generate said second mode; and reflecting means provided with a λ/4 plate provided on the side opposite to the side of one of said pair of substrates which is remote from said projecting means and on which said parent electrode is formed and a plane mirror provided on the side of said λ/4 plate which is opposite to said projecting means, said reflecting means rotating the planes of polarization of both of the polarized components of said incident beam transmitted through said pair of substrates which are orthogonal to each other by approximately 90° and causing said incident beam to re-enter said pair of substrates.

8. A projector according to claim 5, wherein said liquid crystal device(s) transmitted said portions of said first and second radiation beams, respectively, therethrough.

9. A projector according to claim 8, wherein each of said liquid crystal device(s) has;

first and second transparent substrates facing each other, the surfaces of said transparent substrates which are adjacent to the other of said substrates having transparent electrodes formed thereon;

first grating structure formed on said transparent electrode of one of said first and second transparent substrates, a plurality of grooves in said first grating structure extending toward the liquid crystal device(s) of the adjacent image generating means;

a first liquid crystal layer having a double refractive property and filling the space between the transparent electrode of the other of said first and second transparent substrates and said first grating structure;

third and fourth transparent substrates facing each other, the surfaces of said transparent substrates which are adjacent to the other substrate having transparent electrodes formed thereon, said third and fourth transparent substrates being arranged on the path of said incident beam transmitted through said first and second transparent substrates;

second grating structure formed on said transparent electrode of one of said third and fourth transparent substrates, a plurality of grooves in said second grating structure extending toward the liquid crystal device(s) of said adjacent image generating means;

a second liquid crystal layer having a double refractive property and filling the space between the transparent electrode of the other of said third and fourth transparent substrates and said second grating structure;

drive means using the transparent electrodes of said first and second transparent substrates and the transparent electrodes of said third and fourth transparent substrates to control the directions of orientation of a plurality of liquid crystal molecules in said first and second liquid crystal layers, respectively, to thereby direct said plurality of liquid crystal molecules in each of said liquid crystal layers in a direction substantially perpendicular to said surfaces and generate said first mode, and direct said plurality of liquid crystal molecules in each of said liquid crystal layers in a direction substantially parallel to said surfaces and generate said second mode; and a λ/2 plate provided on the path of said incident beam between the set of said first and second transparent substrates and the set of said third and fourth transparent substrates, said λ/2 plate rotating the planes of polarization of both of the polarized components of said incident beam transmitted through said first and second transparent substrates which are orthogonal to each other by approximately 980° and causing said incident beam to enter said third and fourth transparent substrates.

10. A projector comprising;
means for supplying radiation beams;
image generating means for modulating a plurality of portions of said radiation beams individually to form diffused beams and non-diffused beams to generate said images;
and means for projecting said images onto a predetermined plane by the use of one of said diffused beams and non-diffused beams from said image generating means,
wherein said diffused beams by way of said image generating means are designed so to have a rotation-asymmetric orientation characteristic.

11. A projector according to claim 10,
wherein said image generating means has a rectangular shape in which the length of the horizontal direction is longer than that of the vertical direction and
said image generating means is designed so that said diffused beams diffuse in said vertical direction.

12. A projector having;
means for supplying first and second radiation beams;
first image generating means for modulating a plurality of portions of said first radiation beam individually and forming a deflected beam and a non-deflected beam to generate a first image;
second image generating means for modulating a plurality of portions of said second radiation beam individually and forming a deflected beam and a non-deflected beam to generate a second image;
and p1 means for projecting said first and second images onto a predetermined plane by the use of one of said deflected beams and said non-deflected beams from said first and second image generating means, said first and second image generating means emitting said deflected beams so that most of said deflected beam from one of said generating means may substantially not enter the other generating means;
wherein said first and second image generating means transmit said portions of said first and second radiation beams, respectively, therethrough.

13. A projector having;
means for supplying first and second radiation beams;
first image generating means for modulating a plurality of portions of said first radiation beam individually and forming a deflected beam and a non-deflected beam to generate a first image;
second image generating means for modulating a plurality of portions of said second radiation beam individually and forming a deflected beam and a non-deflected beam to generate a second image;
and p1 means for projecting said first and second images onto a predetermined plane by the use of one of said deflected beams and said non-deflected beams from said first and second image generating means, said first and second image generating means emitting said deflected beams so that most of said deflected beam from one of said generating means may substantially not enter the other generating means;
wherein said first and second image generating means diffuse said portions of said first and second radiation beams, respectively, to thereby form said deflected beams;
wherein said first and second image generating means diffract said portions of said first and second radiation beams, respectively, to thereby diffuse the same.

* * * * *